United States Patent
Hong

(10) Patent No.: US 11,252,644 B2
(45) Date of Patent: Feb. 15, 2022

(54) METHOD, DEVICE, USER EQUIPMENT AND BASE STATION FOR USE IN SHORTENING ACCESS DELAY

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/772,032

(22) PCT Filed: Dec. 11, 2017

(86) PCT No.: PCT/CN2017/115497
§ 371 (c)(1),
(2) Date: Jun. 16, 2020

(87) PCT Pub. No.: WO2019/113753
PCT Pub. Date: Jun. 20, 2019

(65) Prior Publication Data
US 2020/0396672 A1 Dec. 17, 2020

(51) Int. Cl.
*H04W 48/14* (2009.01)
*H04W 76/18* (2018.01)
(Continued)

(52) U.S. Cl.
CPC .......... *H04W 48/14* (2013.01); *H04W 36/08* (2013.01); *H04W 74/008* (2013.01); *H04W 74/0833* (2013.01); *H04W 76/18* (2018.02)

(58) Field of Classification Search
CPC ..... H04W 48/14; H04W 76/18; H04W 36/08; H04W 74/008; H04W 74/0833;
(Continued)

(56) References Cited

U.S. PATENT DOCUMENTS 9,020,550 B2   4/2015   Eriksson et al.
9,220,031 B2   12/2015  Feng et al.
(Continued)

FOREIGN PATENT DOCUMENTS

CN    101001448 A    7/2007
CN    101562848      10/2009
(Continued)

OTHER PUBLICATIONS

Combined Chinese Office Action and Search Report dated Sep. 1, 2020 in Patent Application No. 201780002110.3, 7 pages.
(Continued)

*Primary Examiner* — Harry H Kim
(74) *Attorney, Agent, or Firm* — Oblon, McClelland, Maier & Neustadt, L.L.P.

(57) ABSTRACT

The present disclosure relates to a method, device, user equipment and base station for shortening access delay. The method can include receiving a message 3 of a random access procedure sent by a user equipment, and sending a message 4 of the random access procedure to the user equipment in response to determining to refuse access of the user equipment. The message 4 can include a reason value as to why the base station has refused the access.

9 Claims, 7 Drawing Sheets

(51) Int. Cl.
*H04W 36/08* (2009.01)
*H04W 74/00* (2009.01)
*H04W 74/08* (2009.01)
*H04W 48/02* (2009.01)
*H04W 48/20* (2009.01)
*H04W 36/00* (2009.01)

(58) Field of Classification Search
CPC . H04W 48/02; H04W 48/20; H04W 36/0055; H04W 74/002
See application file for complete search history.

(56) References Cited

U.S. PATENT DOCUMENTS

| | | | |
|---|---|---|---|
| 9,734,723 B1* | 8/2017 | Bruno | G08G 5/0056 |
| 2007/0157208 A1 | 7/2007 | Mendelson et al. | |
| 2012/0088498 A1* | 4/2012 | Xiao | H04W 24/02 455/424 |
| 2014/0212129 A1* | 7/2014 | Huang | H04B 10/25 398/2 |
| 2016/0021646 A1* | 1/2016 | Hu | H04W 52/28 370/329 |
| 2016/0269952 A1* | 9/2016 | Moon | H04W 36/08 |
| 2016/0286385 A1 | 9/2016 | Ryu et al. | |
| 2018/0035470 A1* | 2/2018 | Chen | H04W 48/16 |
| 2018/0063770 A1* | 3/2018 | Frenger | H04W 56/0015 |
| 2019/0182296 A1* | 6/2019 | Zeng | H04L 65/1016 |
| 2019/0215872 A1* | 7/2019 | Park | H04W 52/0216 |
| 2020/0229111 A1* | 7/2020 | Kim | H04W 52/242 |

FOREIGN PATENT DOCUMENTS

| | | |
|---|---|---|
| CN | 101690374 A | 3/2010 |
| CN | 101772184 A | 7/2010 |
| CN | 102014516 A | 4/2011 |
| CN | 102017776 A | 4/2011 |
| CN | 102111847 A | 6/2011 |
| CN | 102291836 A | 12/2011 |
| CN | 102448117 A | 5/2012 |
| CN | 102917433 A | 2/2013 |
| CN | 104813711 | 7/2015 |
| CN | 106171011 A | 11/2016 |
| CN | 106332308 A | 1/2017 |
| CN | 107734529 A | 2/2018 |
| WO | WO 2011/122998 A1 | 10/2011 |

OTHER PUBLICATIONS

Huawei, et al., "Enhanced Coverage Authorisation," 3GPP TSG-RAN WG2 Meeting #95bis R2-166329, Oct. 2016, 6 pages.

International Search Report dated Sep. 5, 2018 in PCT/CN2017/115497 filed Dec. 11, 2017, 2 pages.

Combined Chinese Office Action and Search Report dated Apr. 25, 2021 in Chinese Patent Application No. 201780002110.3 (with English translation), 25 pages.

Office Action dated Sep. 13, 2021 in Chinese Application No. 201780002110.3.

* cited by examiner

METHOD, DEVICE, USER EQUIPMENT AND BASE STATION FOR USE IN SHORTENING ACCESS DELAY

CROSS-REFERENCE

This application is a national phase application under 35 U.S.C. § 371 of International Patent Application No. PCT/CN2017/115497, filed on Dec. 11, 2017.

TECHNICAL FIELD

The present disclosure relates to the field of communication technologies, and in particular, to a method, device, user equipment, and base station for shortening access delay.

BACKGROUND

In the related art, during a contention-based random access procedure performed by a user equipment (UE), a base station can resolve the contention through a message 4 MSG4 of the random access procedure. If the UE finds that it does not succeed in the contention after receiving the MSG4, it initiates the random access procedure again in a period after rejection according to a rejection parameter, until the number of random accesses initiated by the UE reaches a maximum allowed number of random accesses. If the UE still cannot successfully access the base station at this time, the UE selects other base station for random access. The contention-based random access procedure in the related art may cause a long access delay for the UE that cannot successfully access the base station.

In the fifth generation mobile communication technology (5th Generation, 5G) network, a new wireless access technology is proposed to study how to meet three major application scenarios such as an enhanced mobile broadband (eMBB), a super-connected machine type communication (MTC) and an ultra-reliable and low latency communication (URLLC) and the like. The URLLC application scenario has a very high requirement for network latency. Therefore, in order that the 5G network can meet a user equipment's requirement for low latency, a new contention-based random access scheme needs to be proposed for the UE to quickly access the base station.

SUMMARY

Embodiments of the present disclosure provide a method, device, user equipment, and base station for shortening access delay.

According to a first aspect of the embodiments of the present disclosure, there is provided a method for shortening access delay that is applied to a base station. The method including receiving a message 3 of a random access procedure sent by a user equipment, and sending a message 4 of the random access procedure to the user equipment in response to determining to refuse access of the user equipment, wherein the message 4 carries a reason value as to why the base station has refused the access.

In an embodiment, the message 4 further carries neighboring base station information of a neighboring base station that the user equipment can randomly access.

In an embodiment, the method can further includes determining a service type of a service to be transmitted by the user equipment and a network status of the base station, and determining whether to allow the access of the user equipment based on the network status of the base station and the service type.

In an embodiment, the method can further include parsing a message 1 of the random access procedure sent by the user equipment for a preamble of a random access, determining the service type of the service to be transmitted by the user equipment based on a correspondence between the preamble of the random access and the service type, or parsing the message 3 of the random access procedure sent by the user equipment for the service type of the service to be transmitted by the user equipment.

In an embodiment, the step of determining whether to allow the access of the user equipment based on the network status of the base station and the service type can include setting an access priority of the user equipment as a high priority in response to that the service type is a first type, wherein the first type indicates that the service to be transmitted is an ultra-reliable and low-latency service type, setting the access priority of the user equipment as a low priority in response to that the service type is not the first type, and preferentially allowing the access of the user equipment with the high priority, when the network status of the base station satisfies a condition for the access of a new user equipment.

According to a second aspect of the embodiments of the present disclosure, there is provided a method for shortening access delay that is applied to a user equipment. The method can include receiving a message 4 of a random access procedure sent by a base station, parsing the message 4 for a reason value as to why the base station has refused access, and determining, based on the reason value, a target base station to which a random access request is made again.

In an embodiment, the message 4 further carries neighboring base station information of a neighboring base station that the user equipment can randomly access, and the step of determining, based on the reason value, a target base station to which a random access request is made again can include selecting one base station from the neighboring base station identified by the neighboring base station information as the target base station, in response to determining, based on the reason value, not to randomly access the base station again, and determining the base station as the target base station, in response to determining, based on the reason value, to randomly access the base station again.

In an embodiment, the step of determining, based on the reason value, a target base station to which a random access request is made again can include determining the base station as the target base station, in response to determining, based on the reason value, to randomly access the base station again, and performing a cell selection operation and determining an accessible base station with best signal quality as the target base station, in response to determining, based on the reason value, not to randomly access the base station again.

In an embodiment, the method can further include determining a preamble of a random access to be sent based on a service type of a service to be transmitted, wherein there is a correspondence between the preamble of the random access and the service type, and sending the preamble of the random access through a message 1 of the random access procedure.

In an embodiment, the method can further include sending the service type of the service to be transmitted through a message 3 of the random access procedure.

According to a third aspect of the embodiments of the present disclosure, there is provided a device for shortening access delay that is applied to a base station. The device can include a first receiving module that is configured to receive a message 3 of a random access procedure sent by a user equipment, and a first sending module that is configured to send a message 4 of the random access procedure to the user equipment in response to that it is determined to refuse access of the user equipment, wherein the message 4 carries a reason value as to why the base station has refused the access.

In an embodiment, the message 4 further carries neighboring base station information of a neighboring base station that the user equipment can randomly access.

In an embodiment, the device further includes a first determining module that is configured to determine a service type of a service to be transmitted by the user equipment and a network status of the base station, and second determining module that is configured to determine whether to allow the access of the user equipment based on the network status of the base station and the service type determined by the first determining module.

In an embodiment, the device can further include a first parsing module, configured to parse a message 1 of the random access procedure sent by the user equipment for a preamble of a random access, a third determining module, configured to determine the service type of the service to be transmitted by the user equipment based on a correspondence between the preamble of the random access and the service type, or a second parsing module, configured to parse the message 3 of the random access procedure sent by the user equipment for the service type of the service to be transmitted by the user equipment.

In an embodiment, the second determining module can include a first setting sub-module, configured to set an access priority of the user equipment as a high priority in response to that the service type is a first type, wherein the first type indicates that the service to be transmitted is an ultra-reliable and low-latency service type, a second setting sub-module, configured to set the access priority of the user equipment as a low priority in response to that the service type is not the first type, and an access sub-module, configured to preferentially allow the access of the user equipment with the high priority, when the network status of the base station satisfies a condition for the access of a new user equipment.

According to a fourth aspect of the embodiments of the present disclosure, there is provided a device for shortening access delay that is applied to a user equipment. The device can include a second receiving module that is configured to receive a message 4 of a random access procedure sent by a base station, a third parsing module that is configured to parse the message 4 received from the second receiving module for a reason value as to why the base station has refused access, and a fourth determining module that is configured to determine, based on the reason value obtained by the third parsing module, a target base station to which a random access request is made again.

In an embodiment, the message 4 further carries neighboring base station information of a neighboring base station that the user equipment can randomly access. The fourth determining module can include a first selection sub-module that is configured to select one base station from the neighboring base station identified by the neighboring base station information as the target base station, in response to that it is determined, based on the reason value, not to randomly access the base station again, and a first determining sub-module that is configured to determine the base station as the target base station, in response to that it is determined, based on the reason value, to randomly access the base station again.

In an embodiment, the fourth determining module includes a second determining sub-module that is configured to determine the base station as the target base station, in response to that it is determined, based on the reason value, to randomly access the base station again, and a second selecting sub-module, configured to perform a cell selection operation and determine an accessible base station with best signal quality as the target base station, in response to that it is determined, based on the reason value, not to randomly access the base station again.

In an embodiment, the device can further include a fifth determining module that is configured to determine a preamble of a random access to be sent based on a service type of a service to be transmitted, wherein there is a correspondence between the preamble of the random access and the service type, and a second sending module that is configured to send the preamble of the random access determined by the sixth determining module through a message 1 of the random access procedure.

In an embodiment, the device further includes a third sending module that is configured to send the service type of the service to be transmitted through a message 3 of the random access procedure.

According to a fifth aspect of the embodiments of the present disclosure, there is provided a user equipment, including a processor, and a memory for storing executable instructions of the processor. The processor can be configured to receive a message 4 of a random access procedure sent by a base station, parse the message 4 for a reason value as to why the base station has refused access, and determine, based on the reason value, a target base station to which a random access request is made again.

According to a sixth aspect of the embodiments of the present disclosure, there is provided a base station, including a processor, and a memory for storing executable instructions of the processor. The processor can be configured to receive a message 3 of a random access procedure sent by a user equipment, send a message 4 of the random access procedure to the user equipment in response to determining to refuse access of the user equipment, wherein the message 4 carries a reason value as to why the base station has refused the access.

According to a seventh aspect of the embodiments of the present disclosure, there is provided a non-transitory computer-readable storage medium having computer instructions stored thereon. The instructions, when being executed by a processor, implement the following steps of receiving a message 4 of a random access procedure sent by a base station, parsing the message 4 for a reason value as to why the base station has refused access, and determining, based on the reason value, a target base station to which a random access request is made again.

According to an eighth aspect of the embodiments of the present disclosure, there is provided a non-transitory computer-readable storage medium having computer instructions stored thereon. The instructions, when being executed by a processor, implement the following steps of receiving a message 3 of a random access procedure sent by a user equipment, and sending a message 4 of the random access procedure to the user equipment in response to determining to refuse access of the user equipment, wherein the message 4 carries a reason value as to why the base station has refused the access.

It should be noted that the above general description and the following detailed description are merely exemplary and explanatory and should not be construed as limiting of the present disclosure.

BRIEF DESCRIPTION OF THE DRAWINGS

The accompanying drawings here, which are incorporated in the specification and constitute a part of the specification, show embodiments of the present disclosure, and along with the specification, serve to explain the principle of the present disclosure.

DETAILED DESCRIPTION

Exemplary embodiments will be described in detail herein, examples of which are illustrated in the accompanying drawings. When the following description is related to the drawings, the same reference numbers in different figures refer to the same or similar elements unless otherwise indicated. The embodiments described in the following exemplary embodiments do not represent all embodiments consistent with the present invention. Instead, they are merely examples of devices and methods consistent with aspects of the present invention as detailed in the appended claims.

The technical solution provided by the present disclosure is applicable to a mobile network, such as a long term evolution (LTE) and a new generation network (such as 5G network). In the mobile network, a UE can access the network through a contention-based random access procedure. In the contention-based random access procedure, the UE sends a preamble to a base station through a message 1 (MSG1) of the random access procedure, and the base station can send a random access response message (i.e., a message 2 (MSG2) of the random access procedure) to the UE in response to receiving the MSG1. After receiving the MSG2, the UE can send a message 3 (MSG3, which can be an RRC connection request message, RRC connection reestablishment request message, RRC handover completion message and the like for different scenarios) of the random access procedure on an uplink resource allocated by the base station. The base station sends a message 4 (MSG4) of the random access procedure to the UE based on the MSG3, and then the UE can determine whether it has successfully accessed the base station based on the MSG4.

Figure 1A:
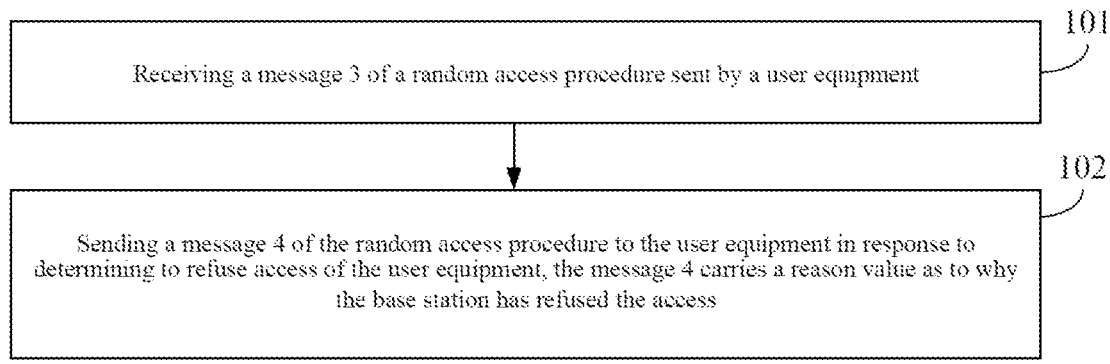
FIG. 1A is a flowchart showing a method for shortening access delay according to an exemplary embodiment.
Figure 1B:
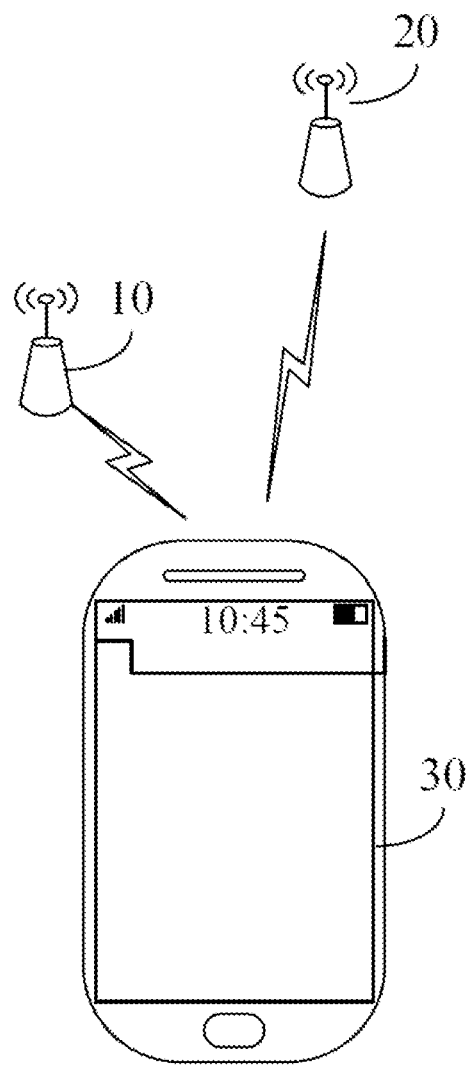
FIG. 1B is a scene diagram showing a method for shortening access delay according to an exemplary embodiment.

FIG. 1A is a flowchart showing a method for shortening access delay according to an exemplary embodiment, and FIG. 1B is a scene diagram showing a method for shortening access delay according to an exemplary embodiment. The method for shortening access delay can be applied to a base station. As shown in FIG. 1A, the method for shortening access delay includes the following steps 101-102.

In step 101, a message 3 of a random access procedure sent by a user equipment is received. In an exemplary embodiment, the message 3 (MSG3) of the random access procedure may carry a service type of a service to be transmitted by the user equipment. Since the service type of the service to be transmitted usually has an association with a device type of the user equipment. Therefore, the message 3 (MSG3) may also carry the device type of the service to be transmitted by the user equipment to indicate the service type of the user equipment. For example, if the device type is an IoV (Internet of Vehicles) device, it can be determined that the service type of the service to be transmitted by the user equipment is an URLLC service type. In an embodiment, a correspondence between the service type and the device type may be predetermined by system. In this way, the base station can determine the service type of the service to be transmitted by the user equipment based on the correspondence between the service type and the device type after receiving the device type sent by the user equipment.

The message 3 (MSG3) may also directly carry the service type of the service to be transmitted by the user equipment. For example, the service type of the service to be transmitted by the user equipment is an eMBB service type, URLLC service type, mass machine type of communication (mMTC) service type and the like. Different service types have different requirements for bandwidth, rate, delay, reliability and other aspects.

Further, the service type may also be a specific type of the service to be transmitted by the user equipment. For example, the service to be transmitted is a video service or an ordinary Internet service and the like.

In step 102, a message 4 of the random access procedure is sent to the user equipment in response to that it is determined to refuse access of the user equipment, wherein the message 4 carries a reason value as to why the base station has refused the access.

In an embodiment, the base station may determine, based on a network status thereof and the service type of the user equipment, whether to allow the access of the user equipment. For example, if the base station is overloaded, it may temporarily refuse the access of the user equipment. Alternatively, if the service type provided by the base station does not match the service type of the service to be transmitted by the user equipment, the base station may refuse the access of the user equipment. If the base station refuses the access of the user equipment, the message 4 of the random access procedure may carry the reason value as to why the base station has refused the access of the user equipment.

In an exemplary scenario, as shown in FIG. 1B, for example, the mobile network is an LTE network (which is not limited to a 4G network in the technical solution of the present disclosure and can also be applied to a new generation network such as 5G network), and the base station is an evolution type base station (eNB). As shown in FIG. 1B, the scenario includes eNB10, eNB20, and UE30. The eNB10 receives a random access request initiated by the UE30. When the eNB10 determines to refuse the access of the UE30, the message 4 of the random access procedure may carry the reason value as to why the access of the user equipment is refused. When the UE 30 receives the message 4 and determines a contention failure, the UE 30 can parse the message 4 for the reason value, and then determines, based on the reason value, whether to continue to access the eNB10 or other base station such as eNB20 that can be randomly accessed. Therefore, it avoids that the UE30 repeatedly initiates the random access request to the eNB10 when determining that eNB10 cannot provide the service, and thus can reduce the access delay.

In this embodiment, through the above steps 101-102, when the UE performs the contention-based random access and the base station refuses the access of the user equipment, the reason value as to why the base station has refused the access of the user equipment (for example, the reason value is that the base station is of high load) can be carried in the message 4 of the random access procedure. In this way, when the user equipment receives the message 4 of the random access procedure and determines that it cannot access the previously requested base station based on the reason value, the user equipment can select other base station to access. Through the above technical solution, it may ensure that the UE selects a suitable base station for the random access in response to receiving the MSG4 indicating that the contention is unsuccessful, which avoids access delay resulting from repeatedly initiating the random access to an inaccessible base station.

The technical solution provided by the embodiments of the present disclosure will be described below with respect to a specific embodiment.

Figure 2:
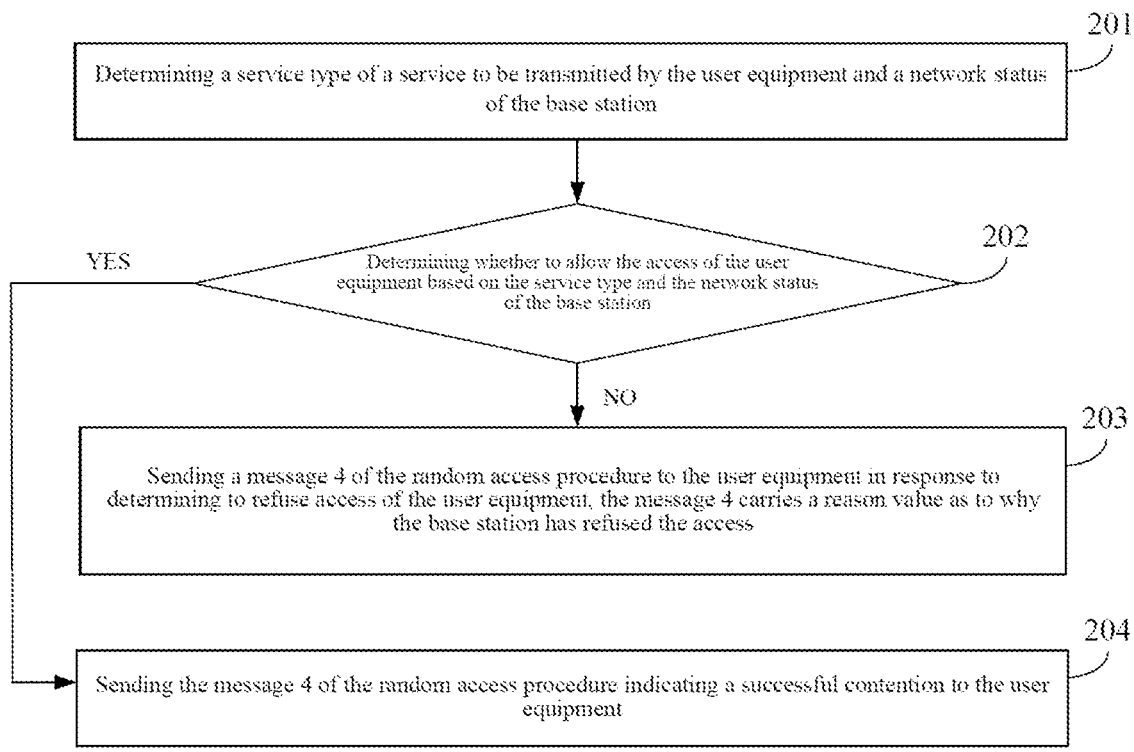
FIG. 2 is a flowchart showing another method for shortening access delay according to an exemplary embodiment.

FIG. 2 is a flowchart showing another method for shortening access delay according to an exemplary embodiment. This embodiment uses the above method provided by the embodiment of the present disclosure. After a base station receives a message 1 or a message 3 of a random access procedure, the base station sends a response message to a user equipment, for example. As shown in FIG. 2, the method includes the following steps.

In step 201, a service type of a service to be transmitted by the user equipment and a network status of the base station are determined. In an exemplary embodiment, the service type of the service to be transmitted by the user equipment may be indicated by a device type of the user equipment. For example, if the device type is an IoV device, it can indicate that the service type of the service to be transmitted by the user equipment is an URLLC service type. In an embodiment, the service type of the service to be transmitted by the user equipment may include an eMBB service type, URLLC service type, mMTC service type and the like. Different service types have different requirements for bandwidth, rate, delay, reliability and the like.

The user equipment may indicate the service type thereof in the message 1 of the random access procedure. In order for the user equipment to indicate the service type through the message 1, a communication system may pre-establish a correspondence between a preamble of the random access and the service type. For example, a preamble 1 corresponds to the URLLC service type, and a preamble 2 corresponds to the eMBB service type, and so on. In response to that the service type of the service to be transmitted by the user equipment is the URLLC service type, the user equipment can send the preamble 1 through the message 1 for the random access. One service type can correspond to a set of access preambles, rather than only one access preamble.

Further, the user equipment may also indicate the service type thereof in the message 3 of the random access procedure. By adding a new signaling element in the message 3, the user equipment may indicate the service type thereof through the new signaling element.

In an embodiment, since the user equipment can indicate the service type thereof through the message 1 or message 3 of the random access procedure, the base station can correspondingly determine the service type of the user equipment by parsing the message 1 or message 3 of the random access procedure.

The network status of the base station can be used to determine whether the base station can allow the access of the user equipment. The network status of the base station can be indicated by a load of the base station, the service type supported by the base station and the like. For example, the network status of the base station is of high load.

In step 202, it is determined whether to allow the access of the user equipment based on the network status of the base station and the service type. If it is determined to refuse the access of the user equipment, step 203 is performed. If it is determined to allow the access of the user equipment, step 204 is performed.

In general, the base station may preferentially consider the user equipment whose access service type is the URLLC service type. For example, when the base station is of high load, for example, the base station determines that it can only allow the access of a small number of user equipment, such as only three more devices, the base station can allow the access of the user equipment whose access service type is the URLLC service type, and can refuse the access of the user equipment whose access service type is not the URLLC service type.

In an embodiment, the service type may also be a specific type of the service to be transmitted by the user equipment, for example, the service to be transmitted is a video service or an ordinary Internet service, and so on. If the service type of the service to be transmitted by the user equipment is the video service, the base station may determine to refuse the access of the user equipment, since the base station usually provides the ordinary Internet service, and has a relative low support for the video service.

In step 203, a message 4 of the random access procedure is sent to the user equipment in response to that it is determined to refuse the access of the user equipment, wherein the message 4 carries a reason value as to why the base station has refused access; and then the procedure ends. In an exemplary embodiment, the message 4 may be obtained by adding the reason value as to why the base station has refused the access of the user equipment to the message 4 of the random access procedure. In an embodiment, a signaling element may be added to the message 4, and the newly added signaling element indicates the reason value for refusing the access of the user equipment.

In an embodiment, the reason value may be high load, unmatched service types, and so on.

The message 4 may also carry neighboring base station information of a neighboring base station that the user equipment can randomly access. The base station may obtain the base station information of the neighboring base station through an interface therebetween, thereby determining the neighboring base station that the user equipment can randomly access. In an embodiment, the neighboring base station information of the neighboring base station may be identification information of the base station.

In step 204, the message 4 of the random access procedure for indicating a successful contention is sent to the user equipment.

In this embodiment, the base station may preferentially allow the access of the user equipment with the URLLC service type based on the service type of the user equipment. When the base station determines to refuse the access of the user equipment, the reason value for refusing can be carried by the message 4 of the random access procedure, so that the user equipment determines whether to continue the random access to the base station based on the reason value. When the user equipment determines not to continue the random access to the base station, the user equipment re-selects one base station for random access. In addition, the base station can carry in the message 4 the information of the neighboring base station that the user equipment can randomly access, which can facilitate the user equipment to determine the target base station for initiating the random access again, thereby shortening the access time of the user equipment.

Figure 3:
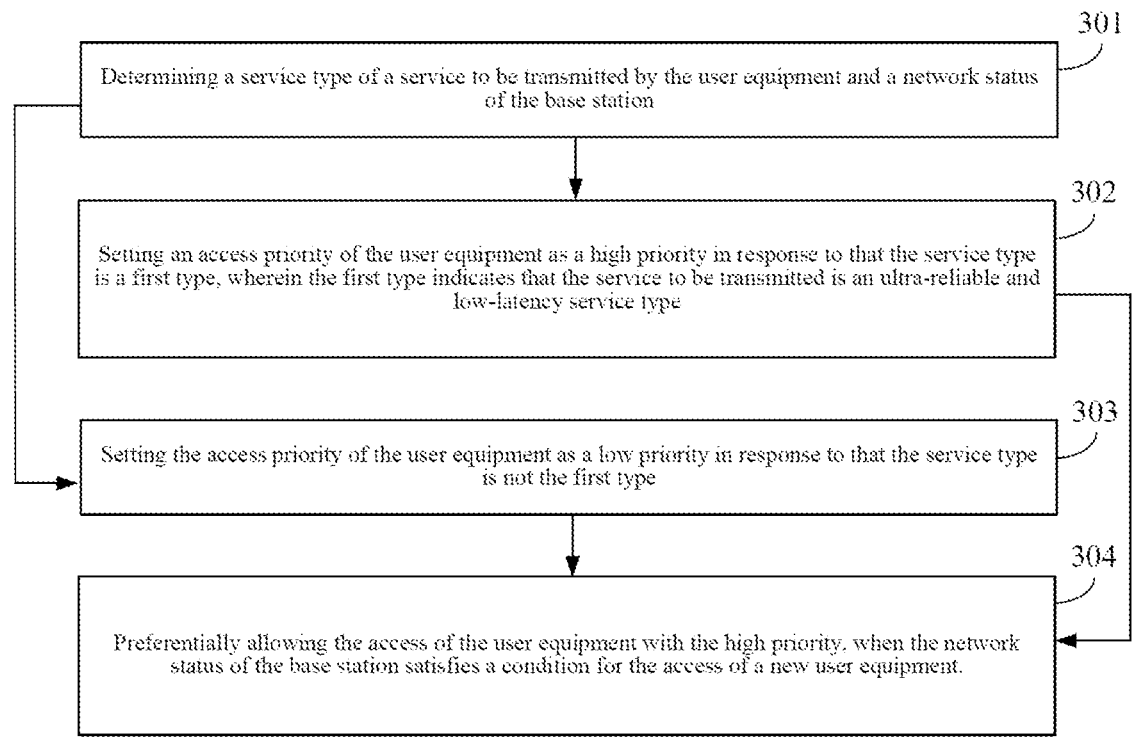
FIG. 3 is a flowchart showing another method for shortening access delay according to an exemplary embodiment.

FIG. 3 is a flowchart showing another method for shortening access delay according to an exemplary embodiment. This embodiment adopts the above method provided by the embodiment of the present disclosure. The base station determines to preferentially allow which user equipment to access based on the service type, for example. As shown in FIG. 3, the method includes the following steps.

In step 301, a service type of a service to be transmitted by a user equipment and a network status of the base station are determined, then step 302 or step 303 is performed. In an exemplary embodiment, the description of the step 301 may refer to the description of the step 201 of the embodiment shown in FIG. 2, and will not be described in detail here.

In step 302, if the service type is a first type, an access priority of the user equipment is set as a high priority, wherein the first type indicates that the service to be transmitted is an ultra-reliable and low-latency service type; and then step 304 is performed.

In step 303, if the service type is not the first type, the access priority of the user equipment is set as a low priority. In an exemplary embodiment, the service type can be divided into two categories, one is the first type, and the other is not the first type, so that the user equipment with high requirement for delay is distinguished from the user equipment without high requirement for delay.

In an embodiment, if a plurality of user equipment currently request for access, different access priorities can be set for the user equipment according to the service types of the user equipment. For example, if it is the URLLC service type, the access priority can be set as the high priority to allow the access of the user equipment with the largest possible. If it is not the URLLC service type, it means that the user equipment does not have high requirement for delay, and when the base station cannot allow the access of too many user equipment currently, the access priority of the user equipment can be set as the low priority.

In step 304, it preferentially allows the access of the user equipment with the high priority, when the network status of the base station satisfies a condition for the access of new user equipment. In an exemplary embodiment, that the network status of the base station satisfies the condition for the access of the new user equipment may be understood as that the base station is not overloaded currently, and may allow the access of the new user equipment.

In this embodiment, the base station may set the corresponding access priority for the user equipment according to whether the service type of the user equipment is the first type, so that the base station may preferentially allow the access of the user equipment with the URLLC service type, which further reduces the access delay of the user equipment with the URLLC service type.

Figure 4:
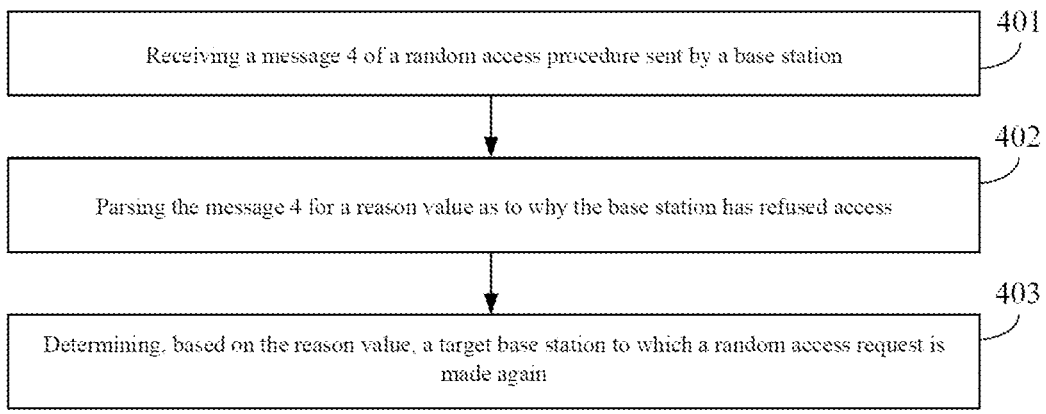
FIG. 4 is a flowchart showing a method for shortening access delay according to an exemplary embodiment.

FIG. 4 is a flowchart showing a method for shortening access delay according to an exemplary embodiment. The method for shortening access delay may be applied to a user equipment. This embodiment is illustratively explained in combination with FIG. 1B. As shown in FIG. 4, the method for shortening access delay includes the following steps 401-403.

In step 401, a message 4 of a random access procedure sent by a base station is received.

In step 402, a reason value as to why the base station has refused access is obtained by parsing the message 4. In an exemplary embodiment, after receiving the message 4 of the random access procedure sent by the base station, the user equipment may perform contention determination based on the message 4 to determine whether the contention conflict is resolved. For the method of contention determination, please refer to contention determination methods in the related art.

In an embodiment, if it is determined that the contention fails, the reason value as to why the base station has refused the access may be obtained by parsing the message 4, that is, the message 4 of the random access procedure.

In step 403, a target base station to which a random access request is made again is determined based on the reason value. In an exemplary embodiment, if the user equipment considers that the reason value as to why the base station has refused the access has little effect on itself, it may use this base station as the target base station and re-initiate the random access in a period after rejection. For example, the reason value is that the URLLC service can not be provided, and what needed by the user equipment is only an ordinary Internet service, then it is considered that this reason value has little effect on the user equipment. The user equipment may re-initiate the random access in a period after rejection. In contrast, if the reason value is that the service provided by the base station does not match the service type of the service to be transmitted by the user equipment, it means that the base station cannot provide the service for the user equipment, and the user equipment needs to reselect one base station as the target base station.

In an embodiment, if the base station uses the message 4 to carry neighboring base station information of a neighboring base station that the user equipment can randomly access, the user equipment may directly initiate the random access to the base station identified by the neighboring base station information. In an embodiment, if the base station does not use the message 4 to carry the neighboring base station information of the neighboring base station that the user equipment can randomly access, the user equipment may perform a cell selection operation and determine an accessible base station with best signal quality as the target base station.

In an exemplary scenario, as shown in FIG. 1B, for example, the mobile network is an LTE network (which is not limited to a 4G network in the technical solution of the present disclosure and can also be applied to a new generation network such as 5G network), and the base station is an evolution type base station (eNB). As shown in FIG. 1B, the scenario includes eNB10, eNB20, and UE30. The eNB10 receives a random access request initiated by the UE30.

When the eNB10 determines to refuse the access of the UE30, the message 4 of the random access procedure may carry the reason value as to why the access of the user equipment is refused. When the UE 30 receives the message 4 and determines a contention failure, the UE 30 can parse the message 4 for the reason value, and then determines, based on the reason value, whether to continue to access the eNB10 or other base station such as eNB20 that can be randomly accessed. Therefore, it avoids that the UE30 repeatedly initiates the random access request to the eNB10 when determining that eNB10 cannot provide the service, and thus can reduce the access delay.

In this embodiment, through the above steps 401-403, after the user equipment receives the message 4 of the random access procedure sent by the base station, if the contention is determined as being failed, the user equipment can determine the target base station for initiating the random access next time through the reason value as to why the base station has refused the access which is obtained by parsing the message 4, which avoids the problem that the contention-based random access procedure of the related art can cause long access delay of the UE that cannot successfully access, whereby shortening the access delay of user equipment.

The technical solution provided by the embodiment of the present disclosure is described below with reference to a specific embodiment.

Figure 5:
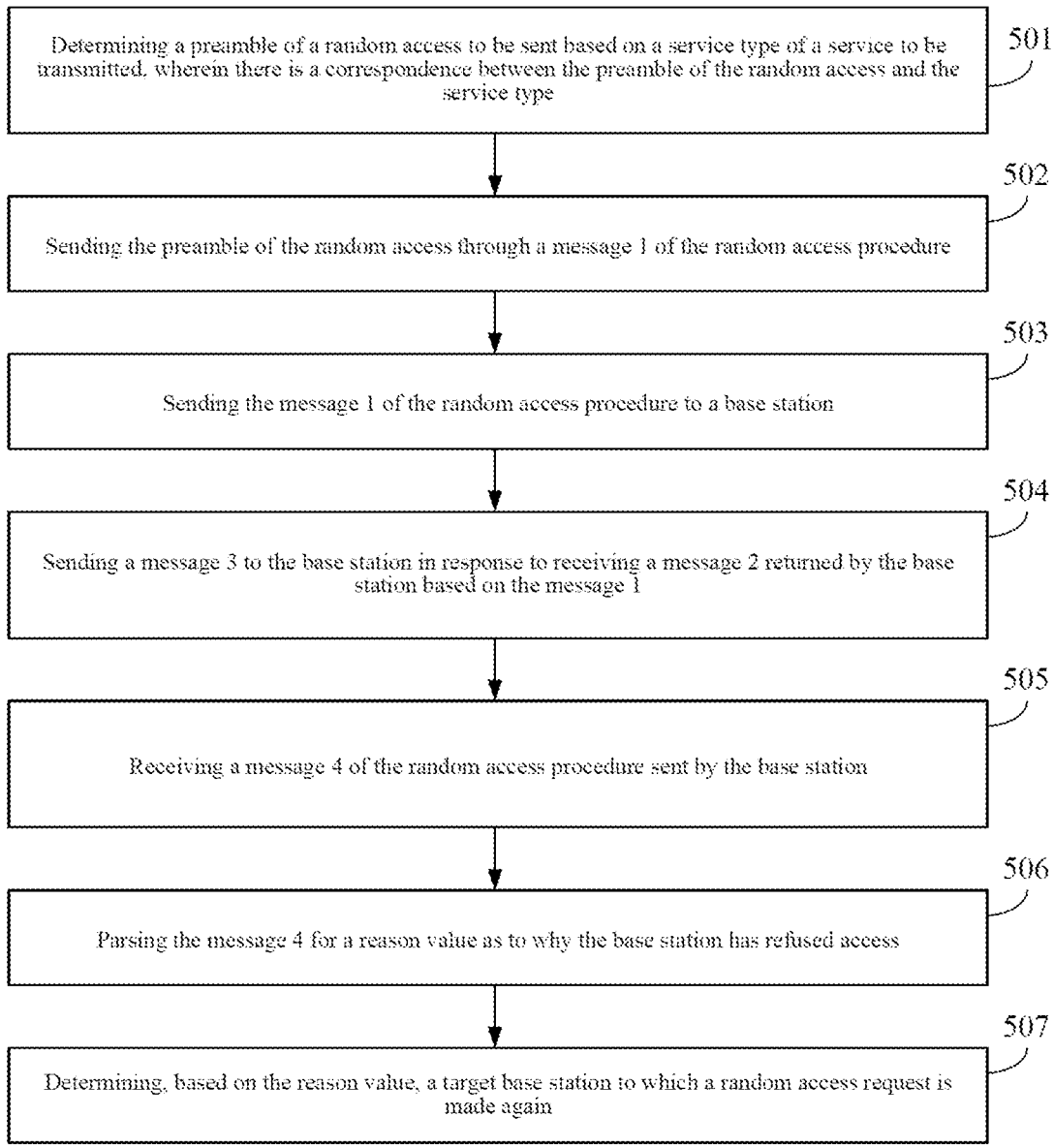
FIG. 5 is a flowchart showing another method for shortening access delay according to an exemplary embodiment.

FIG. 5 is a flowchart showing another method for shortening access delay according to an exemplary embodiment. This embodiment uses the above method provided by the embodiment of the present disclosure, and illustrates how the user equipment to indicate the service type thereof to the base station, for example. As shown in FIG. 5, the method includes the following steps.

In step 501, a preamble of a random access to be sent is determined based on a service type of a service to be transmitted, wherein there is a correspondence between the preamble of the random access and the service type. In an exemplary embodiment, the user equipment may indicate the service type thereof in a message 1 of the random access procedure. In order for the user equipment to indicate the service type through the message 1, a communication system may pre-establish a correspondence between the preamble of the random access and the service type. For example, a preamble 1 corresponds to the URLLC service type, and a preamble 2 corresponds to the eMBB service type, and so on. In response to that the service type of the service to be transmitted by the user equipment is the URLLC service type, the user equipment can send the preamble 1 through the message 1 for the random access.

In an embodiment, one service type can correspond to a set of access preambles. Since the number of preambles is relatively large and the number of the service types is relatively small, the preambles may be divided into N sets, each service type corresponds to a set of access preambles.

In step 502, the preamble of the random access is sent through the message 1 of the random access procedure.

In step 503, the message 1 of the random access procedure is sent to the base station.

In step 504, a message 3 is sent to the base station in response to that a message 2 returned by the base station based on the message 1 is received.

In step 505, a message 4 sent by the base station is received, wherein the message 4 is obtained based on the message 4 of the random access procedure.

In step 506, the reason value as to why the base station has refused access is obtained by parsing the message 4.

In step 507, a target base station to which a random access request is made again is determined based on the reason value.

In an embodiment, the description of steps 505-507 may refer to the embodiment shown in FIG. 4, which will not be described in detail here.

In this embodiment, the user equipment can indicate the service type thereof to the base station through the message 1 of the random access procedure, so that the base station can determine, based on the service type of the user equipment, to preferentially allow the access of which user equipment and refuse the access of which user equipment, and thus the base station can preferentially allow the access of the user equipment with the URLLC service type, which shortens the access delay of the user equipment.

Figure 6:
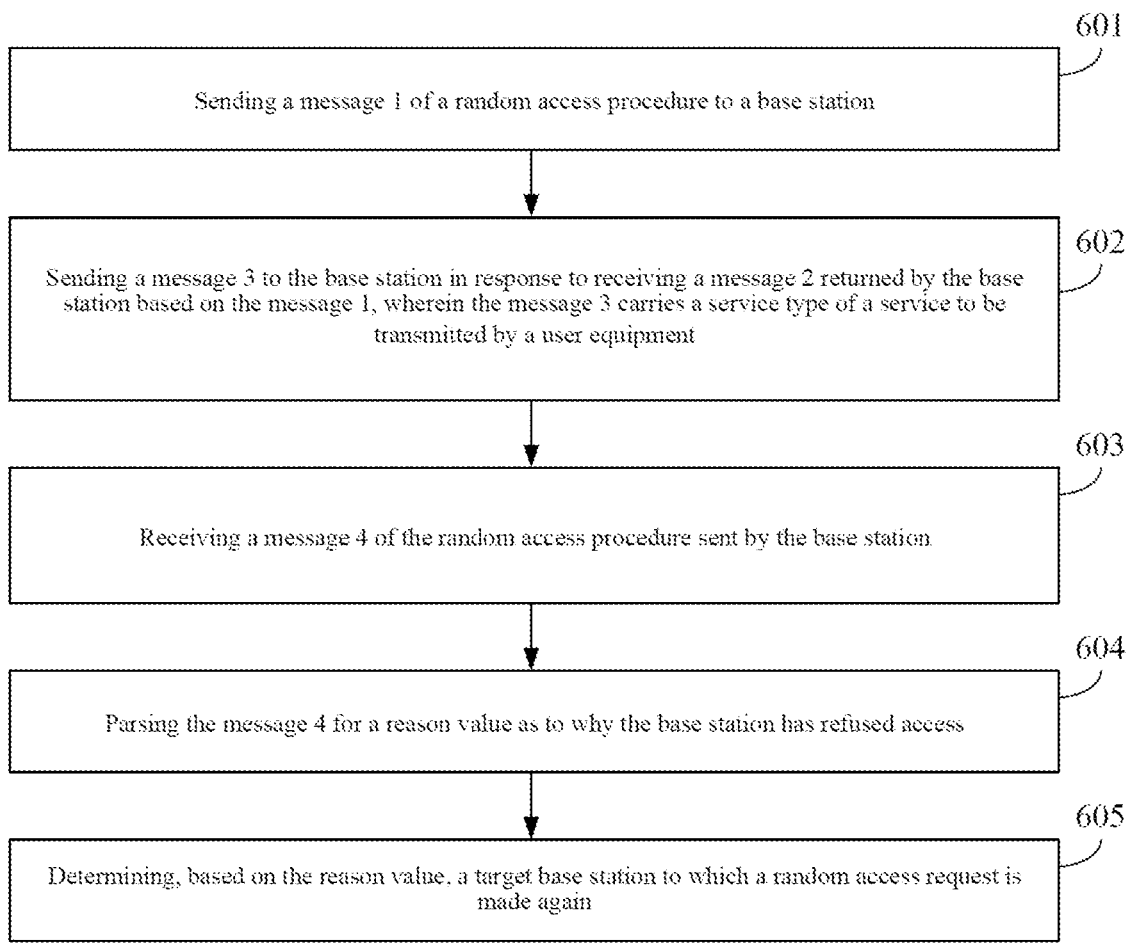
FIG. 6 is a flowchart showing another method for shortening access delay according to an exemplary embodiment.

FIG. 6 is a flowchart showing another method for shortening access delay according to an exemplary embodiment. This embodiment uses the above method provided by the embodiment of the present disclosure, and illustrates how the user equipment indicates the service type thereof to the base station, for example. As shown in FIG. 6, the method includes the following steps.

In step 601, a message 1 of a random access procedure is sent to the base station.

In step 602, a message 3 of the random access procedure is sent to the base station in response to that a message 2 returned by the base station based on the message 1 is received, wherein the message 3 carries the service type of the service to be transmitted by the user equipment. In an exemplary embodiment, the user equipment may add a new signaling element to the message 3, and the new signaling element may indicate the service type of the user equipment.

In step 603, a message 4 of the random access procedure sent by the base station is received.

In step 604, a reason value as to why the base station has refused access is obtained by parsing the message 4.

In step 605, a target base station to which a random access request is made again is determined based on the reason value.

In an embodiment, the description of steps 603-605 can refer to the embodiment shown in FIG. 4, which will not be described in detail here.

In this embodiment, the user equipment can indicate the service type thereof to the base station through the message 3 of the random access procedure, so that the base station can determine, based on the service type of the user equipment, to preferentially allow the access of which user equipment and refuse the access of which user equipment, and thus the base station can preferentially allow the access of the user equipment with the URLLC service type, which shortens the access delay of the user equipment.

Figure 7:
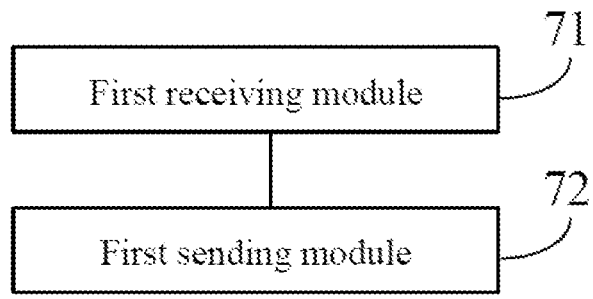
FIG. 7 is a block diagram showing a device for shortening access delay according to an exemplary embodiment.

FIG. 7 is a block diagram showing a device for shortening access delay according to an exemplary embodiment, which is applied to a base station. As shown in FIG. 7, the device for shortening access delay can include a first receiving module 71 that is configured to receive a message 3 of a random access procedure sent by a user equipment, and a first sending module 72 that is configured to send a message 4 of the random access procedure to the user equipment in response to that it is determined to refuse access of the user equipment, wherein the message 4 carries a reason value as to why the base station has refused the access.

Figure 8:
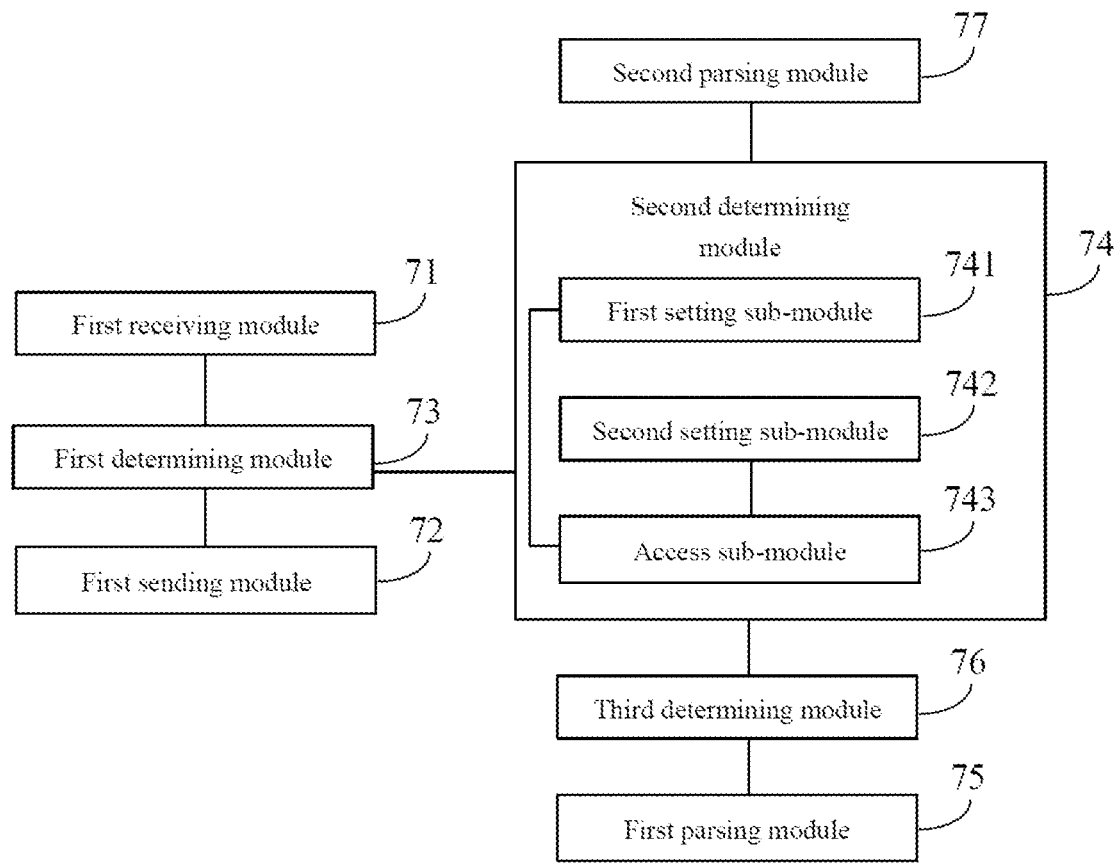
FIG. 8 is a block diagram showing another device for shortening access delay according to an exemplary embodiment.

FIG. 8 is a block diagram showing another device for shortening access delay according to an exemplary embodiment. As shown in FIG. 8, on the basis of the embodiment shown in FIG. 7 above, in an embodiment, the message 4 further carries neighboring base station information of a neighboring base station that the user equipment can randomly access.

In an exemplary embodiment, the device can further include a first determining module 73 that is configured to determine a service type of a service to be transmitted by the user equipment and a network status of the base station, and a second determining module 74 that is configured to determine whether to allow the access of the user equipment based on the network status of the base station and the service type determined by the first determining module 73.

The device can further include a first parsing module 75 that is configured to parse a message 1 of the random access procedure sent by the user equipment for a preamble of a random access, a third determining module 76 that is configured to determine the service type of the service to be transmitted by the user equipment based on a correspondence between the preamble of the random access and the service type, or a second parsing module 77 that is configured to parse the message 3 of the random access procedure sent by the user equipment for the service type of the service to be transmitted by the user equipment.

Further, the second determining module 74 can include a first setting sub-module 741 that is configured to set an access priority of the user equipment as a high priority in response to that the service type is a first type, wherein the first type indicates that the service to be transmitted is an ultra-reliable and low-latency service type, a second setting sub-module 742 that is configured to set the access priority of the user equipment as a low priority in response to that the service type is not the first type, and an access sub-module 743 that is configured to preferentially allow the access of the user equipment with the high priority, when the network status of the base station satisfies a condition for the access of a new user equipment.

Figure 9:
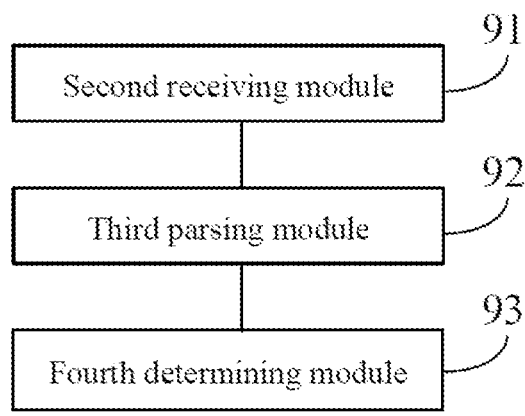
FIG. 9 is a block diagram showing a device for shortening access delay according to an exemplary embodiment.

FIG. 9 is a block diagram showing a device for shortening access delay according to an exemplary embodiment, which is applied to a user equipment. As shown in FIG. 9, the device for shortening access delay can include a second receiving module 91 that is configured to receive a message 4 sent by a base station, a third parsing module 92 that is configured to parse the message 4 received from the second receiving module 91 for a reason value as to why the base station has refused access, and a fourth determining module 93 that is configured to determine, based on the reason value obtained by the third parsing module 92, a target base station to which a random access request is made again.

Figure 10:
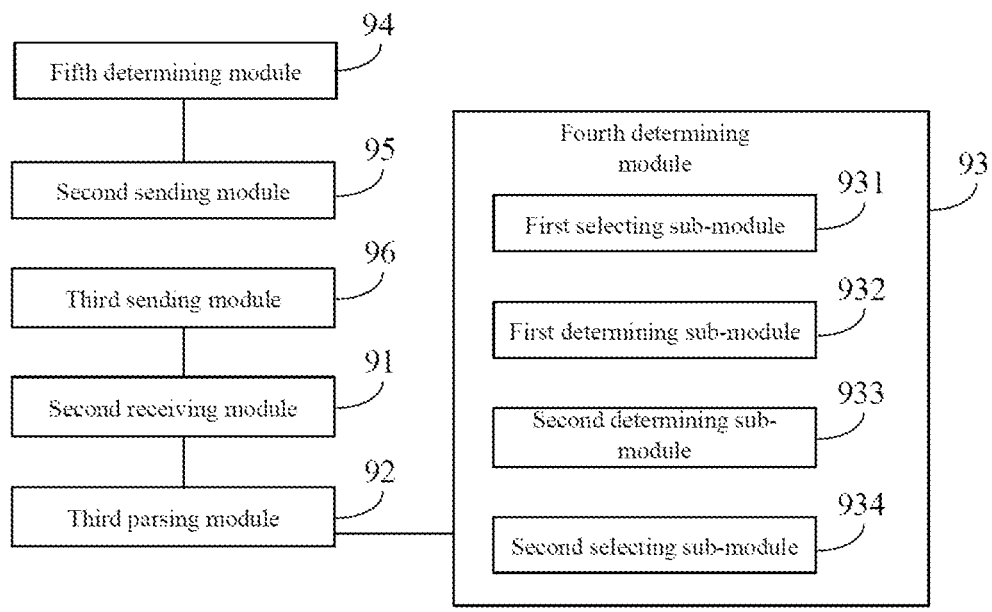
FIG. 10 is a block diagram showing another device for shortening access delay according to an exemplary embodiment.

FIG. 10 is a block diagram showing another device for shortening access delay according to an exemplary embodiment. As shown in FIG. 10, on the basis of the embodiment shown in FIG. 9 above, in an embodiment, the message 4 further carries neighboring base station information of a neighboring base station that the user equipment can randomly access.

The fourth determining module 93 can include a first selection sub-module 931 that is configured to select one base station from the neighboring base station identified by the neighboring base station information as the target base station, in response to that it is determined, based on the reason value, not to randomly access the base station again, and a first determining sub-module 932 that is configured to determine the base station as the target base station, in response to that it is determined, based on the reason value, to randomly access the base station again.

In an embodiment, the fourth determining module 93 can include a second determining sub-module 933 that is configured to determine the base station as the target base station, in response to that it is determined, based on the reason value, to randomly access the base station again, and a second selecting sub-module 934 that is configured to perform a cell selection operation and determine an accessible base station with best signal quality as the target base station, in response to that it is determined, based on the reason value, not to randomly access the base station again.

The device can further include a fifth determining module 94 that is configured to determine a preamble of a random access to be sent based on a service type of a service to be transmitted, wherein there is a correspondence between the preamble of the random access and the service type, and a second sending module 95 that is configured to send the preamble of the random access determined by the fifth determining module 94 through a message 1 of the random access procedure.

In an embodiment, the device can further include a third sending module 96 that is configured to send the service type of the service to be transmitted through a message 3 of the random access procedure.

With regard to the device in the above embodiments, the specific manner in which each module performs the operation has been described in detail in the embodiment related to the method, and will not be set forth here in detail.

Figure 11:
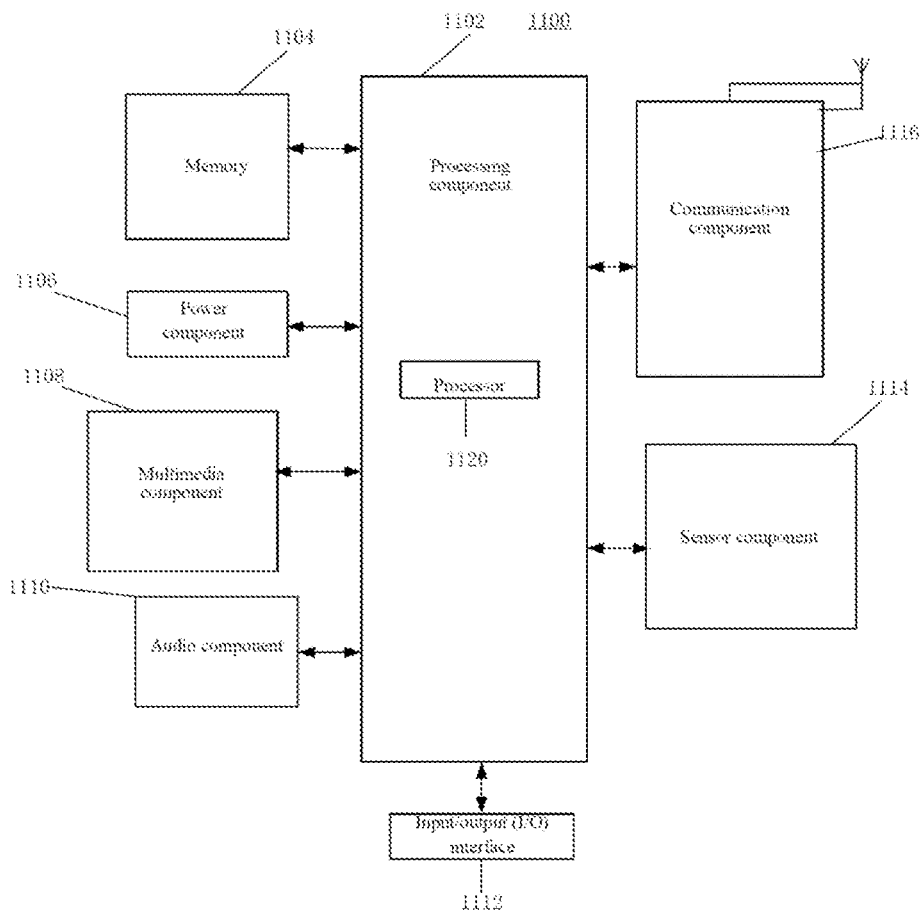
FIG. 11 is a block diagram showing a device suitable for shortening access delay according to an exemplary embodiment.

FIG. 11 is a block diagram showing a device suitable for shortening access delay according to an exemplary embodiment. For example, the device 1100 may be a user equipment such as a mobile phone, a computer, a digital broadcasting terminal, a messaging device, a game console, a tablet device, a medical device, a fitness device, and a personal digital assistant.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as operations associated with display, telephone calls, data communications, camera operations, and recording operations. The processing component 1102 can include one or more processors 1120 to execute instructions to perform all or part of the steps in the above described method. Moreover, the processing component 1102 can include one or more modules to facilitate interaction between the processing component 1102 and other components. For example, the processing component 1102 can include a multimedia module to facilitate the interaction between the multimedia component 1108 and the processing component 1102.

The memory 1104 is configured to store various types of data to support the operation of the device 1100. Examples of such data include instructions for any application or method operated on the device 1100, contact data, phone book data, messages, pictures, videos, and the like. The memory 1104 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1106 provides power to various components of the device 1100. The power component 1106 can include a power management system, one or more power sources, and other components associated with generation, management, and distribution of power in the device 1100.

The multimedia component 1108 includes a screen providing an output interface between the device 1100 and a user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1108 includes a front camera and/or a rear camera. When the device 1100 is in an operation mode, such as a photographing mode or a video mode, the front camera and/or the rear camera can receive external multimedia data. Each of the front camera and the rear camera may be a fixed optical lens system or have focus and optical zoom capability.

The audio component 1110 is configured to output and/or be input with an audio signal. For example, the audio component 110 includes a microphone (MIC) configured to receive an external audio signal when the device 1100 is in an operation mode, such as a call mode, a recording mode, and a voice recognition mode. The received audio signal may be further stored in the memory 1104 or sent via the communication component 1116. In some embodiments, the audio component 1110 also includes a speaker for outputting the audio signal.

The I/O interface 1112 provides an interface between the processing component 1102 and peripheral interface modules, such as a keyboard, a click wheel, a button, and the like. The button may include, but is not limited to, a home button, a volume button, a starting button, and a locking button.

The sensor component 1114 includes one or more sensors for providing status assessments of various aspects of the device 1100. For example, the sensor component 1114 can detect an on/off status of the device 1100, relative positioning of components, such as the display and the keypad of the device 1100. The sensor component 1114 can also detect a change in position of one component of the device 1100 or the device 1100, the presence or absence of user contact with the device 1100, an orientation, or an acceleration/deceleration of the device 1100, and a change in temperature of the device 1100. The sensor component 1114 can include a proximity sensor configured to detect the presence of nearby objects without any physical contact. The sensor component 1114 can also include a light sensor, such as a CMOS or CCD image sensor, configured to be used in imaging applications. In some embodiments, the sensor component 1114 can also include an accelerometer sensor, a gyroscope sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 4G or 5G, or a combination thereof. In an exemplary embodiment, the communication component 1116 receives broadcast signals or broadcast associated information from an external broadcast management system via a broadcast channel. In an exemplary embodiment, the communication component 1116 also includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 1100 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor, or other electronic components.

In an exemplary embodiment, there is also provided a non-transitory computer-readable storage medium including instructions, such as a memory 1104 including instructions executable by the processor 1120 of the device 1100 to perform the above described method. For example, the non-transitory computer readable storage medium may be a ROM, a random access memory (RAM), a CD-ROM, a magnetic tape, a floppy disc, and an optical data storage device.

The processor 1120 can be configured to receive a message 4 sent by a base station, parse the message 4 for a reason value as to why the base station has refused access, and determine, based on the reason value, a target base station to which a random access request is made again.

Figure 12:
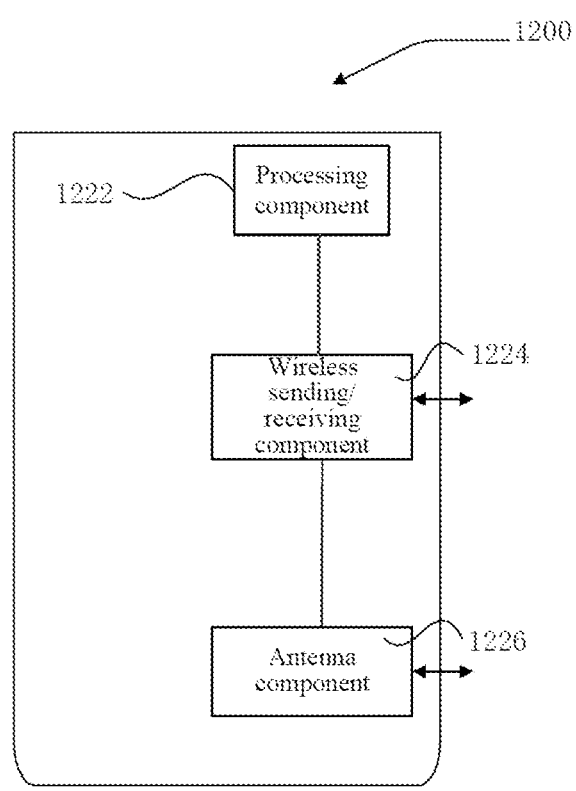
FIG. 12 is a block diagram showing a device suitable for shortening access delay according to an exemplary embodiment.

FIG. 12 is a block diagram showing a device suitable for shortening access delay according to an exemplary embodiment. The device 1200 may be provided as a base station. Referring to FIG. 12, the device 1200 includes a processing component 1222, a wireless sending/receiving component 1224, an antenna component 1226, and a signal processing part specific to a wireless interface. The processing component 1222 may further include one or more processors.

One of the processors in the processing component 1222 can be configured to receive a message 3 of a random access procedure sent by a user equipment, and send a message 4 of the random access procedure to the user equipment in response to that determining to refuse access of the user equipment, wherein the message 4 carries a reason value as to why the base station has refused the access.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principle of the present disclosure and include common knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for shortening access delay, comprising:
receiving a message of a random access procedure sent by a base station;
parsing the message for a reason value as to why the base station has refused access of a user equipment; and
determining a target base station to which a random access request is made again based on the reason value, wherein the message further carries neighboring base station information of at least one neighboring base station that is capable of being randomly accessed by the user equipment, and the determining the target base station to which the random access request is made again based on the reason value further comprises:

selecting one base station from the at least one neighboring base station identified by the neighboring base station information as the target base station, in response to determining not to randomly access the base station again based on the reason value; and determining the base station as the target base station, in response to determining to randomly access the base station again based on the reason value.

2. The method according to claim 1, wherein the step of determining a target base station to which a random access request is made again based on the reason value further comprises:

determining the base station as the target base station, in response to determining to randomly access the base station again based on the reason value; and performing a cell selection operation and determining an accessible base station with best signal quality as the target base station, in response to determining not to randomly access the base station again based on the reason value.

3. The method according to claim 1, wherein the method further comprises:

determining a preamble of a random access to be sent based on a service type of a service to be transmitted, wherein there is a correspondence between the preamble of the random access and the service type; and sending the preamble of the random access through another message of the random access procedure.

4. The method according to claim 3, wherein the method further comprises:

sending the service type of the service to be transmitted through another message of the random access procedure.

5. A non-transitory computer-readable storage medium having computer instructions stored thereon, wherein the instructions, when executed by a processor, implement the method for shortening access delay according to claim 1.

6. A user equipment, comprising:

a processor; and a memory for storing executable instructions that, when executed by the processor, cause the processor to implement a method for shortening access delay comprising:

receiving a message of a random access procedure sent by a base station;

parsing the message for a reason value as to why the base station has refused access of the user equipment; and determining a target base station to which a random access request is made again based on the reason value, wherein the message further carries neighboring base station information of at least one neighboring base station that is capable of being randomly accessed by user equipment, and the determining the target base station to which the random access request is made again based on the reason value further comprises:

selecting one base station from the at least one neighboring base station identified by the neighboring base station information as the target base station, in response to determining not to randomly access the base station again based on the reason value; and determining the base station as the target base station, in response to determining to randomly access the base station again based on the reason value.

7. The user equipment according to claim 6, wherein the processor implements the step of determining the target base station to which the random access request is made again based on the reason value by:

determining the base station as the target base station, in response to determining to randomly access the base station again based on the reason value; and performing a cell selection operation and determining an accessible base station with best signal quality as the target base station, in response to determining not to randomly access the base station again based on the reason value.

8. The user equipment according to claim 6, wherein the memory for storing executable instructions that, when executed by the processor, cause the processor to further implement:

determining a preamble of a random access to be sent based on a service type of a service to be transmitted, wherein there is a correspondence between the preamble of the random access and the service type; and sending the preamble of the random access through another message of the random access procedure.

9. The user equipment according to claim 8, wherein the memory for storing executable instructions that, when executed by the processor, cause the processor to further implement:

sending the service type of the service to be transmitted through another message of the random access procedure.

* * * * *